Sept. 4, 1945.   G. E. HUCK ET AL   2,384,169
FLUID PRESSURE MECHANISM
Filed Aug. 14, 1942
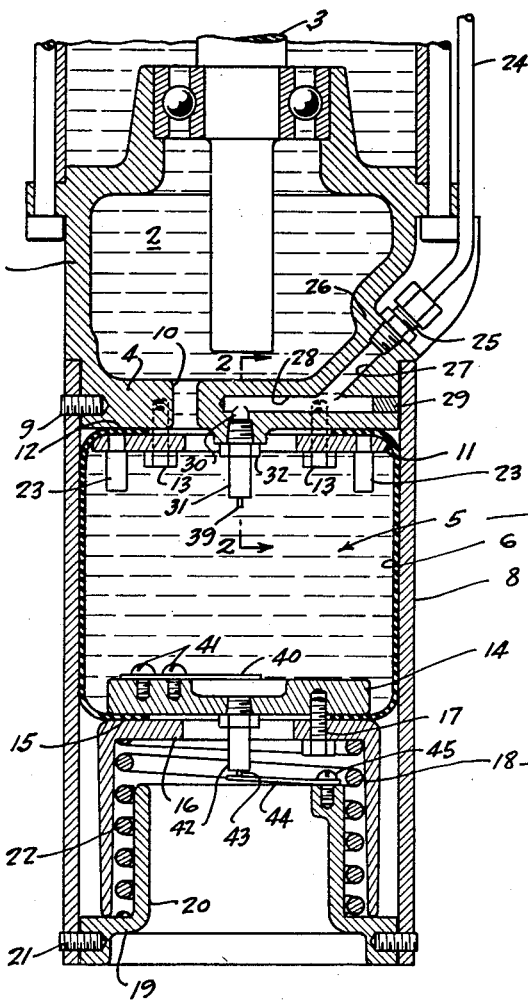
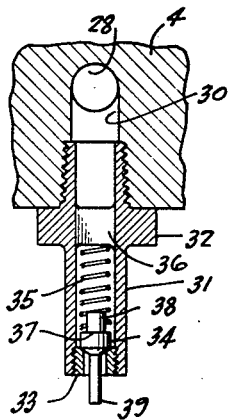
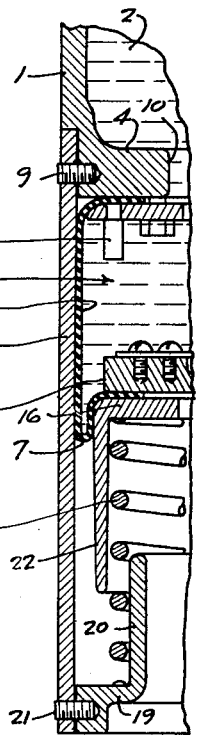
INVENTORS
George E. Huck
Frederick O. Luenberger
BY John Flann
ATTORNEY Patented Sept. 4, 1945

2,384,169

UNITED STATES PATENT OFFICE 2,384,169

FLUID PRESSURE MECHANISM

George E. Huck, Southgate, and Frederick O. Luenberger, Los Angeles, Calif., assignors to U. S. Electrical Motors, Inc., Los Angeles, Calif., a corporation of California Application August 14, 1942, Serial No. 454,880

4 Claims. (Cl. 137—68)

This invention relates to fluid pressure devices, and particularly to mechanisms adapted to sustain substantial pressures, such as variable volume chambers or the like.

An example of mechanisms that employ fluids under pressure, is a cylinder, in which a piston operates. The cylinder space is caused to have variable volume in accordance with the position of the piston. Instead of a piston, the variable volume mechanism may utilize a flexible wall capable of being deflected, as a boundary for the space defining the variable volume. Such a wall may be in the form of a diaphragm, or a corrugated tubular-like body (usually termed a Sylphon).

It is one of the objects of this invention to improve in general, variable volume mechanisms operating under fluid pressure.

It is another object of this invention to provide a simple and inexpensive device of this character, that is capable of continued cycles of operation without material depreciation.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawing:

Figure 1 is a longitudinal sectional view of an apparatus incorporating the invention;

Fig. 2 is an enlarged fragmentary sectional view taken along plane 2—2 of Fig. 1; and Fig. 3 is a fragmentary sectional view similar to Fig. 1, but illustrating a different phase of operation.

In the present instance the invention is illustrated in connection with an electric motor casing 1 or the like, adapted to be filled with an insulating liquid 2, such as oil. The motor shaft 3 is shown as projecting downwardly toward an end wall 4.

In the event that the motor structure is utilized in submerged condition, as for example in a well, it is desirable to maintain the pressure of the liquid filling 2 between definite limits. In this way the problem of sealing the casing 1 against ingress of well liquid is rendered easier.

In order to accomplish this result, use is made of a variable volume chamber 5 connected with the interior of the casing 1. The arrangement is such that the liquid 2 is replenished in the event that there is a sufficient shrinkage or reduction of the volume of chamber 5; and conversely, in the event chamber 5 expands beyond a desirable limit, some of the liquid filling 2 is discharged. In this way a normal pressure is ensured within the casing 1.

The chamber 5 is defined by a thin, flexible wall 6. This flexible wall 6 is of general annular form. The member 6 may be made from relatively thin flexible material such as "Neoprene" or an equivalent rubber, or a rubber substitute. By making the member 6 of sufficiently thin material, it can readily be doubled upon itself as illustrated at 7 (Fig. 3) to reduce the volume of chamber 5.

Since this thin member 6 is utilized under substantial pressure, provisions are made for confining the expansion of the member 6 within a reinforcing shell 8. This shell 8 is shown as suspended by the aid of one or more headless screws 9 from the bottom wall 4 of the casing 1. The shell 8 need not fit accurately over the external periphery of the bottom wall 4. Furthermore, the headless screw 9 can have considerable clearance in the through apertures in the shell 8.

The communication between the chamber 5 and the interior of the casing 1 is effected by a passageway 10 extending through the bottom wall 4. The upper end of the flexible member 6 is joined in fluid-tight manner to the wall 4 as by the aid of a clamping plate 11. For this purpose, the upper end of the member 6 is turned inwardly to form the upper flexible flange 12 clamped between the lower surface of the wall 4 and the clamping plate 11. A number of clamping screws 13 is provided to ensure a fluid tight seal between the member 6 and the wall 4.

The bottom wall of the chamber 5 is defined by a plate 14. The lower end of the flexible member 6 is turned inwardly to form a bottom flange 15, clamped between the end wall 14 and an exterior flange 16. This clamping can be effected by the aid of one or more screws 17, thereby ensuring a fluid tight joint between the end wall 14 and the flange 15.

The flange 16 is shown as in contact with the upper end of a compression spring 18. This compression spring has its lower end in contact with the flange 19 of an annular spring guide 20. The spring guide 20 is held in place at the lower end of the shell 8 as by the aid of one or more headless screws 21 threaded into the flange 19 and passing through clearance apertures in the shell 8. Further to confine the compression spring 18, the flange 16 is provided with a depending annular portion 22.

The spring 18 urges the wall 14 resiliently upwardly, tending to reduce the volume of chamber 5, and thereby causing the filling 2 to be placed under an increased pressure.

Since the member 6 is very flexible and made of very thin material, the end wall 14 can readily move to the position illustrated in Fig. 3 without injuring the member 6. As shown most clearly in Fig. 3, the wall 14 and the flange 6 fit within the shell 8 but leave a sufficient clearance to permit the member 6 to fold upon itself in the manner illustrated at 7.

In Fig. 1 the maximum expansion of chamber 5 is illustrated. This expansion is limited by contact of the lower end of the portion 22 with the flange 19. Compression or collapse of the chamber 5 is limited in a similar manner by the aid of stops 23 fastened to the clamping flange 11. These stops 23 are adapted to engage the top surface of the wall 14 when the wall 14 moves upwardly as the volume of chamber 5 is reduced.

Means are provided in the present instance to replenish the fluid or liquid 2 within the casing 1 in the event the chamber 5 collapses beyond a desirable limit; and similarly means are also provided to discharge some of the liquid 2 in the event that the chamber 5 expands to the limit illustrated in Fig. 2.

Thus a conduit 24 connected at its upper end to a suitable source of fluid supply is intended to be placed in communication with the interior of the chamber 5. For this purpose the conduit 24 is shown as coupled to a nipple 25. The nipple 25 is threaded into the sloping wall 26 formed on the lower portion of the casing 1. The nipple is furthermore in communication with the sloping passageway 27. This sloping passageway in turn connects with a horizontal passageway 28 drilled into the end wall 4 and closed as by a plug 29. Leading downwardly from the passageway 28 is a passageway 30 (Fig. 2). Threaded into the passageway 30 is a valve housing 31. This valve housing 31 is provided with a hexagonal body portion 32 in order to assist in threading the valve housing 31 into position with respect to the passageway 30. In the lower end of the valve housing 31 is threaded a valve seat 33 having an upper tapered surface. Cooperating with this valve seat is a valve closure 34. This closure member 34 is urged toward closed position by compression spring 35. The upper end of the compression spring 35 abuts the transverse rib 36 formed in the valve housing 31. The lower end of the spring 35 engages the shoulder 37 formed between the guiding projection 38 and the closure 34. Furthermore, the closure 34 is provided with an operating stem 39 projecting through the seat 33.

When the chamber 5 collapses as wall 14 moves upwardly to an undesired extent, the stem 39 is urged upwardly by a flexible arm 40. This flexible arm 40 is attached as by screws 41 to the top of wall 14. Accordingly upon a sufficient decrease in volume of chamber 5, the stem 39 is pushed upwardly and liquid through conduit 24 is permitted to flow past the closure 33 into the chamber 5. The valve remains open until the arm 40 releases the stem 39, by downward movement of wall 14.

In the event the chamber 5 is expanded beyond the desired limit, an outlet valve 42 is utilized to discharge some of the liquid into the well. This valve 42 has a structure identical with the inlet valve structure already described. Its operating stem 43 is adapted to be contacted by a flexible arm 44 joined as by a screw 45 to the upper portion of the guide member 20. Thus when the chamber 5 expands to the extent illustrated in Fig. 1, the stem 43 is contacted by arm 44, restricting further movement of the closure, and causing the valve to open. Liquid is thus allowed to discharge into the well, and this continues until the volume of chamber 5 is reduced to a normal value.

What is claimed is:

1. In combination, means forming a flexible annular-like wall, a substantially rigid shell surrounding said wall and in contact therewith, means forming a movable end wall joined to said annular-like wall, to form a variable volume chamber, and means for intermittently supplying fluid under pressure to said chamber, comprising a valve member controlling the passage of fluid into the chamber, said valve member having a protruding operating stem, and a resilient arm member arranged to contact and operate said stem, one of said members being carried by said movable end wall, to cause the valve to open upon reduction of the volume in the chamber.

2. In combination, means forming a flexible annular-like wall, a substantially rigid shell surrounding said wall and in contact therewith, means forming a movable end wall joined to said annular-like wall, to form a variable volume chamber, a valve member controlling a port communicating with the interior of the chamber, said valve member having a protruding operating stem, and a resilient arm member arranged to contact and operate the stem, one of said members being carried by said movable end wall, to cause the valve to open when the end wall approaches a limiting position.

3. In combination, means forming a flexible annular-like wall, a substantially rigid shell surrounding said wall and in contact therewith, means forming a movable end wall joined to said annular-like wall, to form a variable volume chamber, a pair of valve members respectively for admitting fluid under pressure into the chamber and for releasing fluid from said chamber, each of said valve members having a protruding operating stem, and a pair of resilient arm members respectively arranged to contact and operate said stems, said movable end wall carrying some of the members to cause operation of the valve for admitting fluid when the volume is reduced, as well as to cause operation of the valve for releasing fluid when the volume is increased.

4. In combination, means forming a flexible annular-like wall that defines a variable volume pressure chamber, relatively rigid means surrounding the wall and in contact therewith for serving as a support for the wall, a movable end wall joined to said flexible wall, valve means for introducing fluid into the chamber, means operating to open said inlet upon a reduction in the volume of the chamber below a minimum, a discharge valve for the chamber, and means for opening said discharge valve only upon a substantial increase of volume above that point where the inlet valve is closed.

GEORGE E. HUCK.
FREDERICK O. LUENBERGER.